United States Patent [19]

Harms et al.

[11] 4,214,082

[45] Jul. 22, 1980

[54] ANTHRAQUINONE REACTIVE DYESTUFFS

[75] Inventors: Wolfgang Harms; Klaus Wunderlich, both of Leverkusen; Klaus von Oertzen, Cologne, all of Fed. Rep. of Germany

[73] Assignee: Bayer Aktiengesellschaft, Leverkusen, Fed. Rep. of Germany

[21] Appl. No.: 31,851

[22] Filed: Apr. 20, 1979

[30] Foreign Application Priority Data

Apr. 22, 1978 [DE] Fed. Rep. of Germany ....... 2817733

[51] Int. Cl.$^2$ .............................................. C07D 251/50

[52] U.S. Cl. ...................................... 544/189; 544/188

[58] Field of Search ................................ 544/189, 188

[56] References Cited

U.S. PATENT DOCUMENTS

| | | | |
|---|---|---|---|
| 3,558,621 | 1/1971 | Bien et al. ............................ | 544/189 |
| 3,974,160 | 8/1976 | Seiler et al. .......................... | 544/187 |

FOREIGN PATENT DOCUMENTS

| | | | |
|---|---|---|---|
| 832400 | 6/1958 | United Kingdom ..................... | 544/189 |

*Primary Examiner*—Robert V. Hines

*Assistant Examiner*—Raymond K. Covington

*Attorney, Agent, or Firm*—Sprung, Felfe, Horn, Lynch & Kramer

[57] ABSTRACT

Dyestuffs of the formula

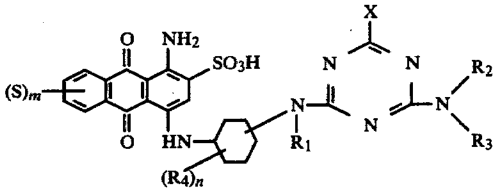

wherein S, m, X, $R_1$, $R_2$, $R_3$, $R_4$ and n have the meaning indicated in the description, and their use for dyeing and printing textile materials containing hydroxyl groups and textile materials containing nitrogen, in particular textile materials of natural and regenerated cellulose, and furthermore of wool, silk and synthetic polyamide and polyurethane fibres. The resulting dyeings are distinguished by good fastness to light and wet processing.

4 Claims, No Drawings

ANTHRAQUINONE REACTIVE DYESTUFFS

The present invention relates to reactive dyestuffs of the formula

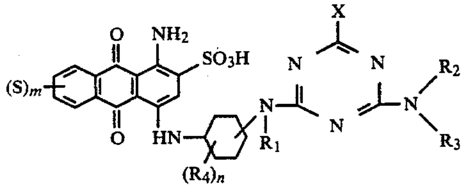

(I)

wherein

S=a substituent, m=0, 1 or 2,

X F, Cl or Br, $R_1$ and $R_2$ H or optionally substituted $C_1$–$C_4$ alkyl, $R_3$ optionally substituted phenyl, naphthyl or $C_1$–$C_4$-alkyl, at least one of the radicals $R_2$ or $R_3$ containing at least one group which confers solubility in water, $R_4$=a substituent and n=1, 2, 3 or 4

Examples of suitable radicals $R_1$ are H, —$CH_3$, —$C_2H_5$, —$CH_2CH_2OH$ and —$CH_2CH_2OSO_3H$.

Examples of suitable radicals $R_2$ are H, —$CH_3$, —$C_2H_5$, —$CH_2SO_3H$, —$CH_2COOH$, —$CH_2CH_2SO_3H$, —$CH_2CH_2$—$CH_2$—COOH, —$CH_2CH_2OH$ and —$CH_2CH_2OSO_3H$.

Examples of suitable substituents S are $SO_3H$, chlorine, bromine, hydroxyl and acetylamino.

Examples of suitable radicals $R_3$ are phenyl, 2-, 3- or 4-sulphophenyl, 2,4-, 2,5- or 3,5-disulphophenyl, 2-, 3- or 4-carboxyphenyl, 2-carboxy-4- or -5-sulphophenyl, 3-carboxy-5-sulphophenyl, 2-methyl-4,5-disulphophenyl, 4-methyl-2- or -3-sulphophenyl, 2-methyl-4- or -5-sulphophenyl, 2,6-dimethyl-3- or -4-sulphophenyl, 2,4-dimethyl-6-sulphophenyl, 2-chloro-4- or -5-sulphophenyl, 3-chloro-2-methyl-6-sulphophenyl, 4-methoxy-2- or -3-sulphophenyl, 2-methoxy-5-sulphophenyl, 2-(β-hydroxyethoxy)-5-sulphophenyl, 4-(β-hydroxyethoxy)-2-sulpho- or -3-sulpho-phenyl, 4-sulphomethylphenyl, 1,5-, 2,6-, 4,8-, 5,7- or 6,8-disulpho-2-naphthyl, 2,4-, 3,7- 3,8-, 4,8-, 5,7- or 6,8-disulpho-1-naphthyl, 1,5,7- or 3,6,8-trisulpho-2-naphthyl and 3,5,7- or 3,6,8-trisulpho-1-naphthyl, sulphomethyl, 2-sulphoethyl and 3-sulpho-1-propyl.

Suitable radicals $R_4$ are, in particular, optionally substituted $C_1$–$C_4$-alkyl.

Preferred dyestuffs within the scope of the dyestuffs (I) are those of the formula

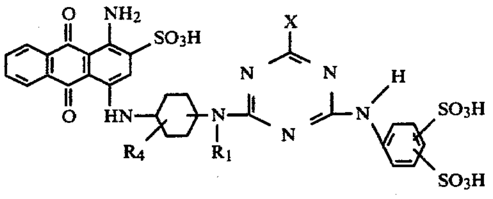

(II)

in particular those of the formula II where X=F or Cl.

The new dyestuffs are obtained by subjecting aminocyclohexylamino-anthraquinone compounds of the formula

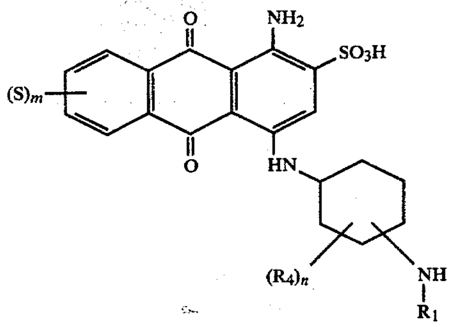

(III)

wherein S, m, $R_1$, $R_4$ and n have the meaning indicated above, to condensation reactions with dihalogenotriazinarylamino compounds of the formula

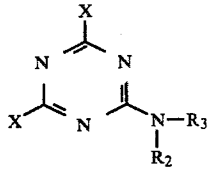

(IV)

wherein $R_2$ and $R_3$ have the meaning indicated above.

Examples of compounds of the formula (IV) which are suitable for the condensation reaction are 2,4-difluoro-6-(2',3'- or 4'-sulphophenylamino)-triazine, 2,4-difluoro-6-(2',4'-, 2',5'-, 3',4'- or 3',5'-disulphophenylamino)triazine, 2,4-difluoro-6-(1',5'-, 2',6'-, 4',8'-, 5',7'- or 6',8'-disulpho-2'-naphthylamino)-triazine, 2,4-difluoro-6-(2',4'-, 3',7'-, 3',8'-, 4',8'-, 5',7'- or 6',8'-disulpho-1'-naphthylamino)-triazine, 2,4-difluoro-6-(1',5',7'- or 3',6',8'-trisulpho-2'-naphthylamino)-triazine, 2,4-difluoro-6-(3',5',7'-trisulpho-1'-naphthylamino)-triazine, 2,4-di-fluoro-6-(2'-, 3'- or 4'-carboxyphenylamino)-triazine, 2,4-difluoro-6-(2'-carboxy-4'- or -5'-sulphophenylamino)-triazine, 2,4-difluoro-6-(3'-carboxy-5'-sulphophenylamino)-triazine, 2,4-difluoro-6-(2'-methyl-4'- or -5'-sulphophenylamino)-triazine, 2,4-difluoro-6-(4'-methyl-2'- or -3'-sulphophenylamino)-triazine, 2,4-difluoro-6-(2'methyl-4',5'-disulphophenylamino)-triazine, 2,4-difluoro-6-(2',6'-dimethyl-3'-sulpho- or 2',4'-dimethyl-6'-sulpho-phenylamino)-triazine, 2,4-difluoro-6-(4'-methoxy-2'-sulpho- or -4'-methoxy-3'-sulpho- or -2'-methoxy-5'-sulpho-phenylamino)-triazine, 2,4-difluoro-6-(2'-β-hydroxyethoxy-5'-sulpho- or 4'-β-hydroxyethoxy-2'-sulpho- or -4'-β-hydroxyethoxy-3'-sulpho-phenylamino)-triazine, 2,4-difluoro-6-(2'-, 3'- or 4'-sulphophenylmethylamino)-triazine, 2,4-difluoro-6-(2'-carboxy-5'-sulphophenyl-methylamino)-triazine, 2,4-difluoro-6-(3'- or 4'-sulphomethylphenylamino)-triazine, 2,4-difluoro-6-[N-(sulphomethyl)-phenylamino]-triazine, 2,4-difluoro-6-[3'-sulpho-N-(carboxymethyl)-phenylamino]-triazine and the analogous 2,4-dichloro- or 2,4-dibromo-6-arylaminotriazines, and furthermore 2,4-difluoro-6-(N-methyl-N-sulphomethylamino)-triazine, 2,4-difluoro-6-(Sulphoethylamino)-triazine, 2,4-difluoro-6-[N-methyl-N-(2-sulphoethyl-)amino]-triazine and the analogous 2,4-dichloro or 2,4-di-bromo compounds.

The reaction of the aminocyclohexylaminoanthraquinone compounds (III) with the dihalogenotriazinylarylamino compounds (IV) is carried out in an aqueous or organic-aqueous medium at temperatures from −10° to 80°, preferably at 0°–50°, and at pH values of 5–10, preferably 6.0–9.0, in the presence of alkaline condensing agents, such as aqueous alkali metal hydroxide solutions, alkali metal carbonate solutions or alkali metal phosphate solutions.

The preparation of the 2,4-dihalogeno-6-arylamino compounds (IV) can be carried out, for example, by condensation of 2,4,6-trihalogeno-triazines with arylamines of the formula

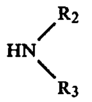

(V)

wherein $R_2$ and $R_3$ have the meaning indicated above, in an aqueous, aqueous-organic or organic medium in the presence of basic condensing agents, such as, for example, aqueous alkali metal hydroxide solutions, alkali metal carbonate solutions, alkali metal bicarbonate solutions or alkali metal phosphate solutions or N,N-dialkylanilines or trialkylamines.

The difluorotriazinylarylamino compounds (IV) can also be obtained by the methods indicated in German Offenlegungsschrift (German Published Specification) 1,644,616.

A particularly preferred and appropriate method consists of a procedure in which the solutions of the reactive components (IV), obtained by condensation of 2,4,6-trihalogenotriazines with arylamines, are reacted directly, without intermediate isolation, with the aminocyclohexylaminoanthraquinone compounds (III).

According to another preparation procedure, the new reactive dyestuffs (I) are also obtained by reacting the amino-cyclohexylaminoanthraquinone compounds (III) with 2,4,6-trihalogenotriazines in an aqueous, aqueous-organic or organic medium to give intermediate products of the formula

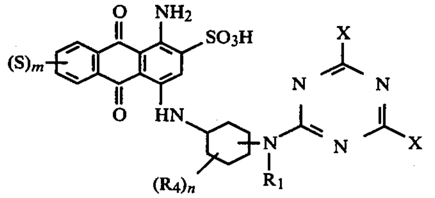

(VI)

S, m, $R_1$, $R_4$ and n has the meaning indicated above, and to subject these reactive dyestuff intermediate products to a condensation reaction with the arylamino compounds (V) in a second reaction step.

The new dyestuffs are extremely valuable products which are suitable for the most diverse application purposes. As water-soluble compounds, they are preferably of interest for dyeing textile materials containing hydroxyl groups and textile materials containing nitrogen, in particular textile materials of natural and regenerated cellulose, and furthermore of wool, silk and synthetic polyamide and polyurethane fibres.

The materials mentioned are dyed or printed by the processes customary for reactive dyestuffs. Brilliant blue dyeings and prints which are fast to light and wet processing are obtained.

The temperatures given in the examples are in °C. The formulae of the dyestuffs in the description and the examples are those of the free acids. In general, the dyestuffs are isolated and used in the form of their alkali metal salts, in particular the sodium salts or potassium salts.

EXAMPLE 1

A. 19.2 g of 2-aminobenzene-1,4-disulphonic acid are dissolved in 150 ml of water by adding about 52 ml of Z N sodium carbonate. The solution is cooled to 0°–5° and 11.5 g of 2,4,6-trifluorotriazine are added dropwise in the course of 10 minutes. The pH value is kept at 4.5 with Z N sodium carbonate solution during the dropwise addition. 10 minutes after the dropwise addition, after about 60 ml of Z N sodium carbonate solution have been consumed, the condensation reaction has ended.

B. 23.4 g of 1-amino-4-(3'-amino-4'-methyl-cyclohexylamino)-anthraquinone-2-sulphonic acid are dissolved n 500 m of water with 35 ml of 4 N sodium hydroxide solution by warming to 65°. The solution is cooled to 0°–5°. This solution is now added dropwise, at the same time as the solution, prepared under A, of the reactive component, to 80 ml of initially introduced ice-water in a manner such that a pH value of 8.3–8.8 is maintained in the reaction mixture. This pH value is then maintained further by adding 2 N sodium hydroxide solution dropwise, and the temperature is kept at 0°–5°. When the condensation reaction has ended, after subsequently stirring the mixture for several hours, the solution is warmed to 20°–25° and adjusted by introducing solid potassium chloride up to a content of 22–23%. The dyestuff of the formula

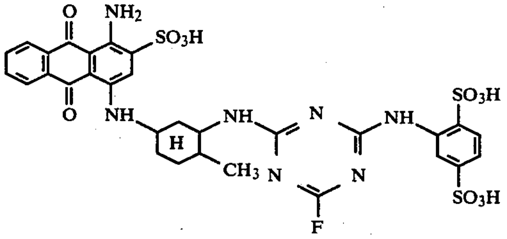

which has precipitated is filtered off at 30°, washed with 25% strength potassium chloride solution and dried at 45° in vacuo.

C. 50 g of cotton hanks are dyed in 1 liter of dye liquor, which contains 1.5 g of the above dyestuff, by heating the bath to 40° in the course of 30 minutes, adding 50 g of sodium chloride in several portions, then adding 20 g of sodium carbonate and treating the hanks at this temperature for 60 minutes. After rinsing, soaping at the boil and drying, a very brilliant blue dyeing of excellent fastness to light and wet processing is obtained.

EXAMPLE 2

A. 14.8 g of 4-aminobenzene-1,3-disulphonic acid are dissolved, at pH 4.5, in 300 ml of water. The solution is cooled to 0°–5° and 9.0 g of 2,4,6-trifluorotriazine are added dropwise in the course of 5–10 minutes. During this addition, the pH value is kept at 4.2–4.5 by adding 2 N sodium carbonate solution dropwise. After the dropwise addition, the mixture is further stirred for some minutes under the conditions indicated, until the condensation reaction has ended.

B. 18.0 g of 1-amino-4-(3'-amino-2'-methyl-cyclohexylamino)-anthraquinone-2-sulphonic acid are dissolved, at pH 12, in 450 ml of water with sodium hydroxide solution at 60°. The solution is cooled to 0°–5° and the pH value is carefully adjusted to 9.0–9.5 with hydrochloric acid. The solution, prepared according to paragraph A, of the reactive component is then added dropwise in the course of about 15–20 minutes and the pH value of the reaction mixture is kept at 8.0–8.5 with 2 N sodium hydroxide solution. After the reaction had ended, the dyestuff solution is warmed to 20°–30° and the dyestuff is precipitated from the solution with 22–23% of potassium chloride. It is filtered off, washed with saturated potassium chloride solution and dried at 45° in vacuo. In the form of the free acid, the dyestuff corresponds to the formula

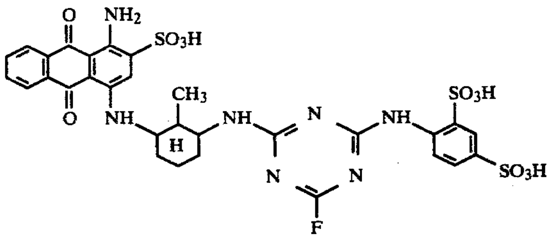

C. 100 g of cotton fabric are padded on a padder at room temperature with an aqueous solution which contains 30 g/liter of dyestuff and 20 g/liter of sodium carbonate, in a manner such that the liquor pick-up of the fabric is 80% of its dry weight. The fabric is rolled up and stored at 25° C. for 24 hours in a manner such that no moisture can escape. The fabric is then rinsed, soaped at the boil and dried. A very brilliant blue dyeing which is fast to light and wet processing is obtained.

Further reactive dyestuffs which dye cellulose fibres in brilliant blue shades which are fast to light and wet processing can be built up in an analogous manner when the anthraquinone components indicated in column (2) in Table I below are reacted with the reactive components in column (3).

Table I

| Example No. | Arthraquinone component (2) | Reactive component (3) |
|---|---|---|
| 3 | 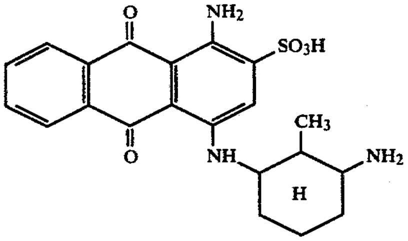 | 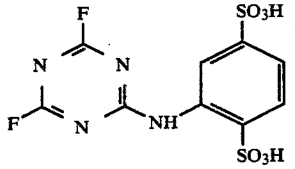 |
| 4 | 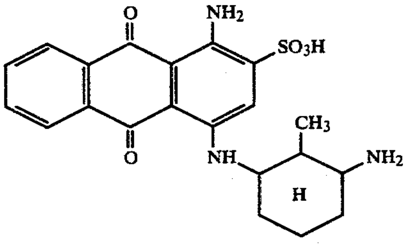 | 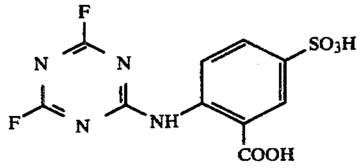 |
| 5 | 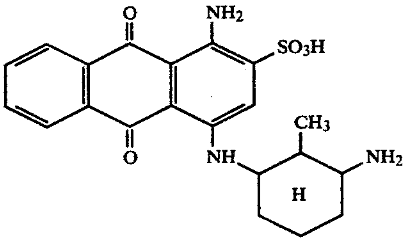 | 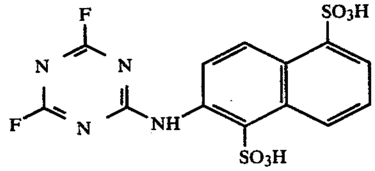 |
| 6 | 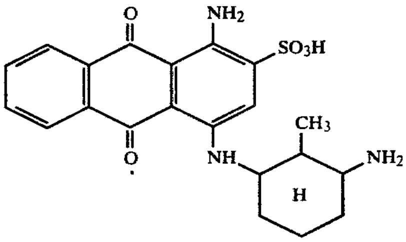 | 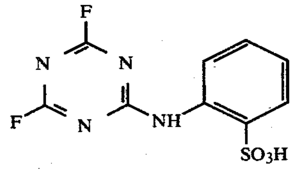 |

Table I-continued
| Example No. | Arthraquinone component (2) | Reactive component (3) |
|---|---|---|
| 7 | 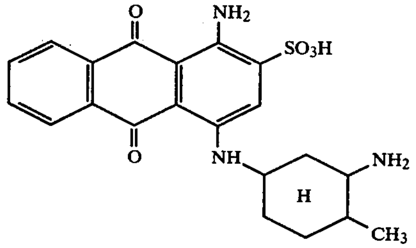 | 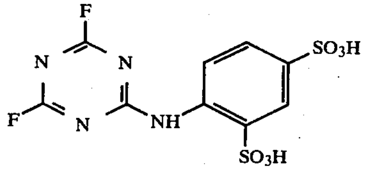 |
| 8 | 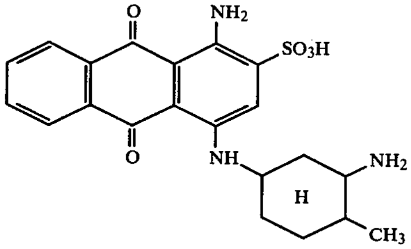 | 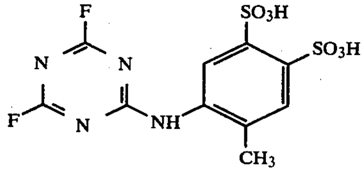 |
| 9 | 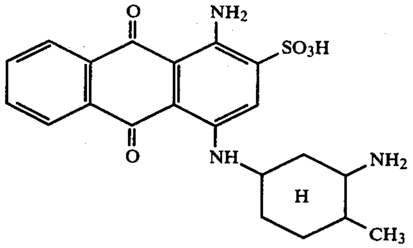 | 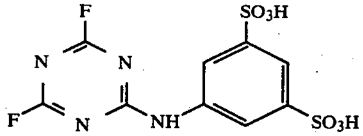 |
| 10 | 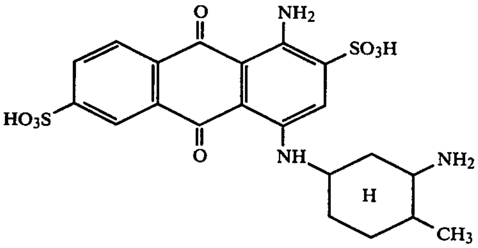 | 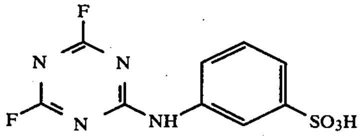 |
| 11 | 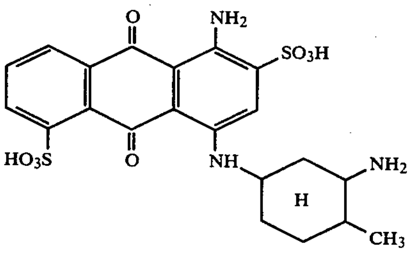 | 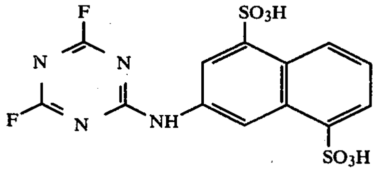 |
| 12 | 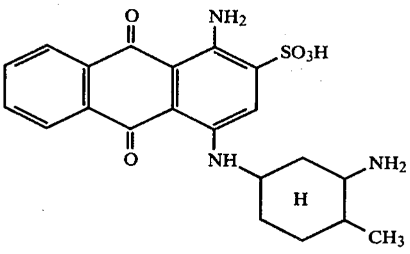 | 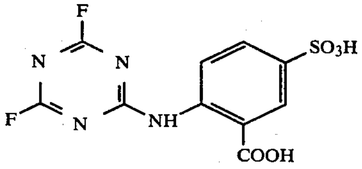 |

Table I-continued
| Example No. | Arthraquinone component (2) | Reactive component (3) |
|---|---|---|
| 13 | 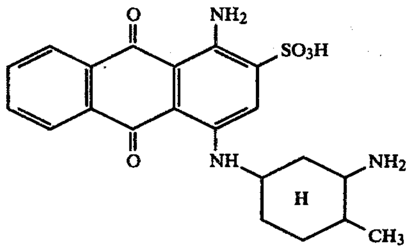 | 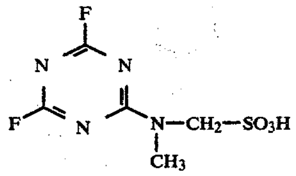 |
| 14 | 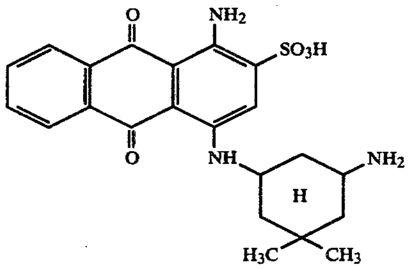 | 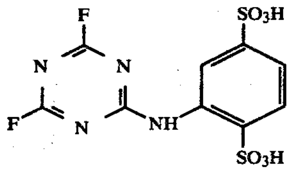 |
| 15 | 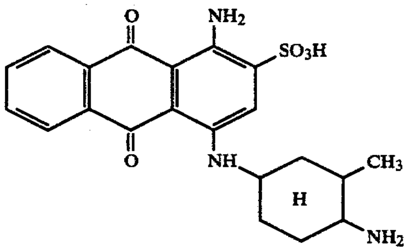 | 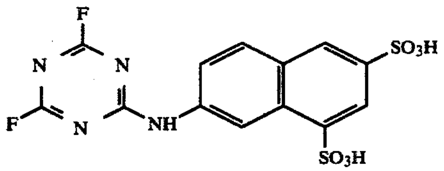 |
| 16 | 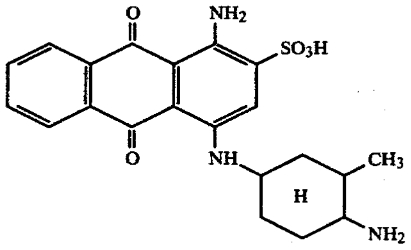 | 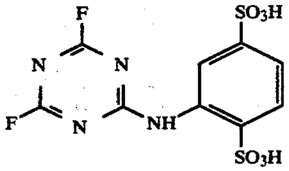 |
| 17 | 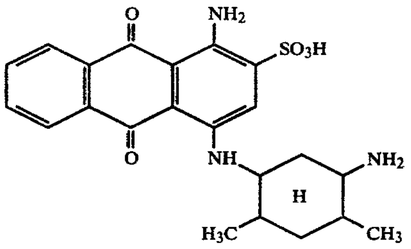 | 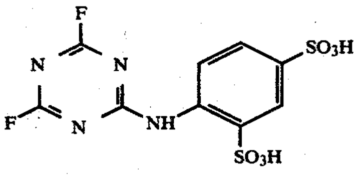 |
| 18 | 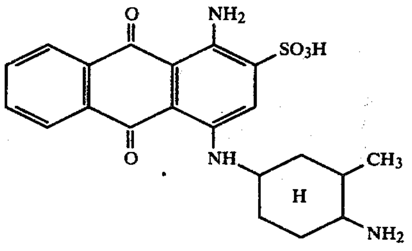 | 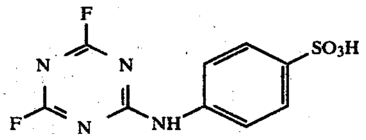 |

Table I-continued

| Example No. | Arthraquinone component (2) | Reactive component (3) |
|---|---|---|
| 19 | 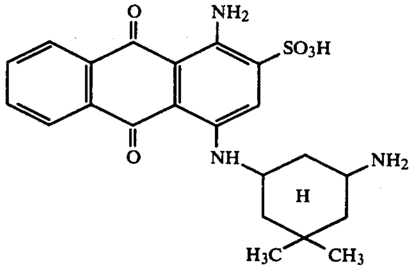 | 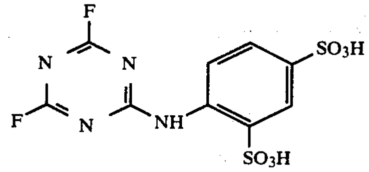 |
| 20 | 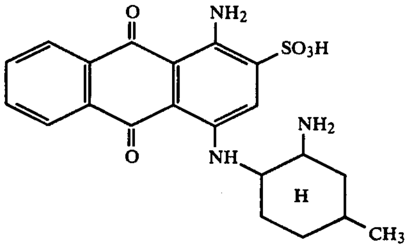 | 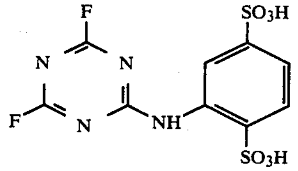 |
| 21 | 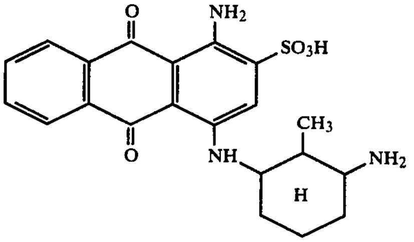 | 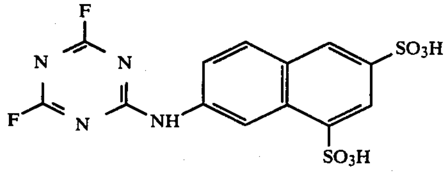 |
| 22 | 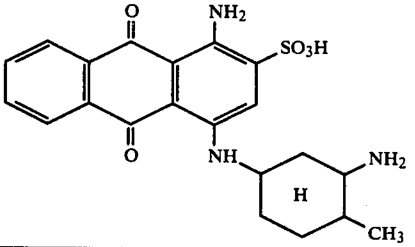 | 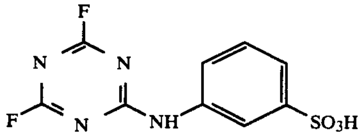 |

EXAMPLE 23

A. 14.6 g of 2-aminobenzene-1,4-disulphonic acid are dissolved in 100 ml of water by adding about 48 ml of 2 N sodium carbonate solution until the pH value is 4.5. 10.7 g of finely ground cyanuric chloride are introduced at 20° in the course of 15 minutes and the pH value is kept at 4.5–5.0 with 2 N sodium carbonate solution. The mixture is subsequently stirred for 3–4 hours, until the cyanuric chlorid has been consumed and the condensation reaction has thus ended.

B. 20.5 g of 1-amino-4-(3'-amino-4'-methyl-cyclohexylamino)-anthraquinone-2-sulphonic acid are dissolved in 450 ml of water with 30 ml of 4 N sodium hydroxide solution by warming at 65°. The solution is cooled to 20° and then added dropwise, at the same time as the reactive component prepared under A, into 80 ml of initially introduced water in a manner such that the pH value of the reaction mixture is kept at 8.7–9.0. After introducing the dyestuff component, the pH value is further maintained in the above range with 2 N sodium hydroxide solution. The mixture is now subsequently stirred at 20° for 2 hours, the temperature is increased to 30°–35° and the condensation reaction between the reactive component and the dyestuff component is brought to completion.

The resulting dyestuff of the formula

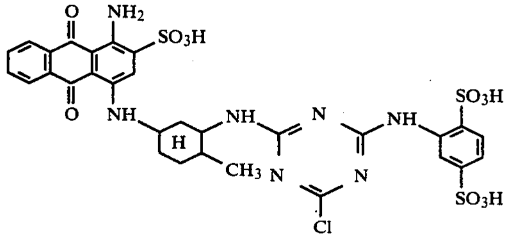

is salted out by saturating the resulting solution with sodium chloride, filtered off, washed with saturated sodium chloride solution and dried at 50° in vacuo.

C. Cellulose fabric is printed with a printing paste which contains, per kilogram, 40 g of the above dyestuff, 100 g of urea, 300 ml of water, 500 g of alginate thickener and 20 g of sodium carbonate and has been made up to 1 kilogram with water, and the fabric is dried, steamed at 105° for 8 minutes, rinsed with hot water and then soaped at the boil, rinsed and dried. A very brilliant blue print with very good fastness to light and wet processing is obtained in this manner.

EXAMPLE 24

A. 12.0 g of 5-aminobenzene-1,3-disulphonic acid are dissolved, at pH 5, in 150 ml of water. 8.8 g of finely ground cyanuric chloride are introduced into this solution at 20° and the pH value is kept at 4.5–5.0 with 2 N sodium carbonate solution. The condensation reaction is then brought to completion by subsequently stirring the mixture for several hours.

B. 16.8 g of 1-amino-4-(4'-amino-3'-methylphenylamino)anthraquinone-2-sulphonic acid are dissolved in 350 ml of water at 65°, 55 ml of 4 N sodium hydroxide solution being added. The solution is cooled to 20° and added dropwise, at the same time as the solution of the reactive component from A, to 80 ml of initially introduced water in a manner such that a pH value of 8.7–9.0 is established in the reaction mixture. After the dropwise addition of the anthraquinone component, the pH value is maintained further with 2 N sodium hydroxide solution. After the condensation reaction has ended, which can be accelerated by warming gently to 30°–35°, the dyestuff formed, of the formula

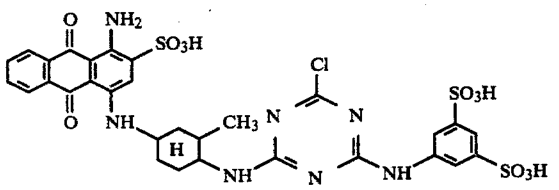

is salted out with about 20–22% of potassium chloride, filtered off and washed with 20% strength potassium chloride solution. It is dried at 60° in vacuo.

On cellulose fabric, the resulting product likewise gives, in accordance with the printing instructions of Example 3 C, brilliant blue prints with very good fastness to light and wet processing.

C. The dyeing of cellulose materials can be carried out in the following manner:

100 g of cotton fabric are padded at room temperature with an aqueous solution which contains 3% of the above dyestuff, 20 g/liters of sodium bicarbonate and 150 g/liter of urea, and the fabric is intermediately dried, heated to 140° for 2 minutes and then rinsed and soaped at the boil. The fabric is dyed in extremely brilliant blue shades which are fast to light and wet processing.

Instead of heating the intermediately dried fabric to 140°, it can also be steamed at 105° for 5 minutes in order to achieve similar dyeings.

In a manner analogous to that indicated in the preceding examples, further reactive dyestuffs can be obtained when the anthraquinone dyestuff components listed in column (2) of Table II are subjected to condensation reactions with the reactive components in column (3). On cellulose fibres, the dyestuffs thus obtained likewise give, in accordance with the techniques described, very brilliant blue dyeings or prints which are fast to light and wet processing.

Table II

| Example No. | Anthraquinone component (2) | Reactive component (3) |
|---|---|---|
| 25 | 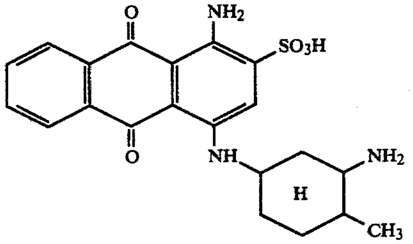 | 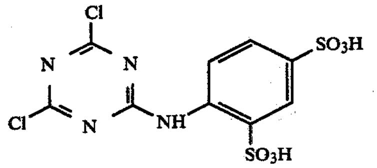 |
| 26 | 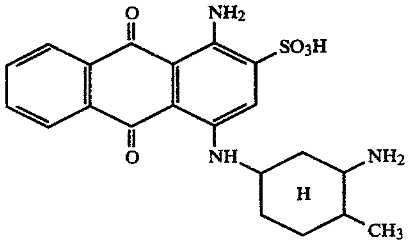 | 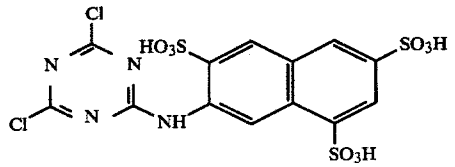 |
| 27 | 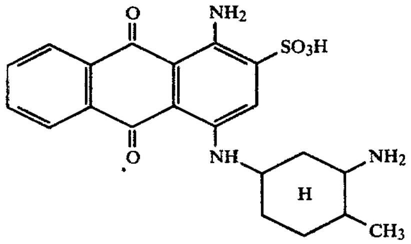 | 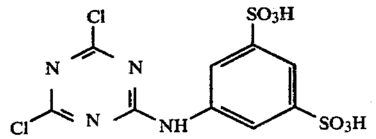 |

Table II-continued
| Example No. | Anthraquinone component (2) | Reactive component (3) |
| --- | --- | --- |
| 28 | 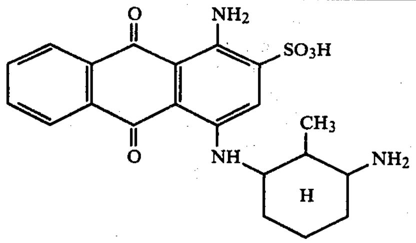 | 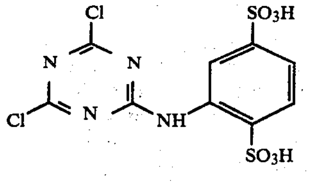 |
| 29 | 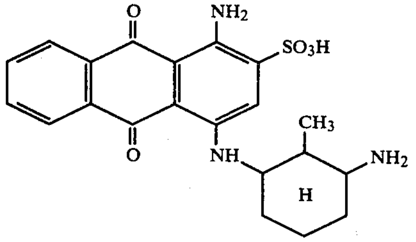 | 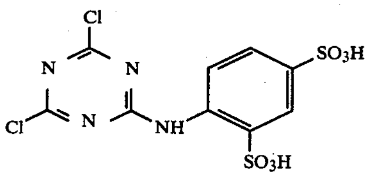 |
| 30 | 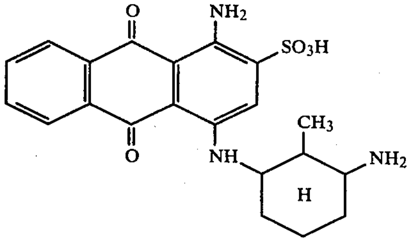 | 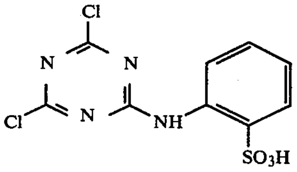 |
| 31 | 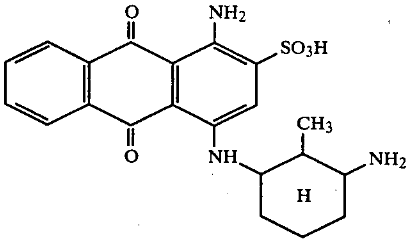 | 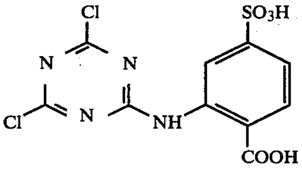 |
| 32 | 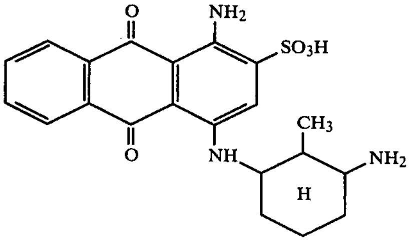 | 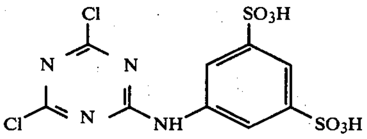 |
| 33 | 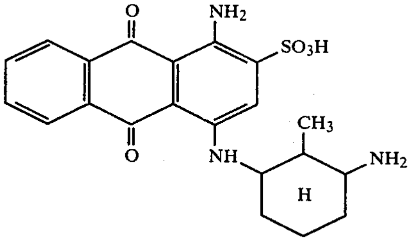 | 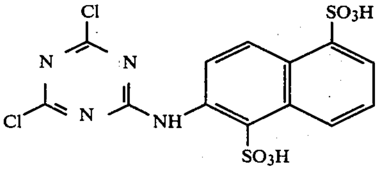 |
| 34 | 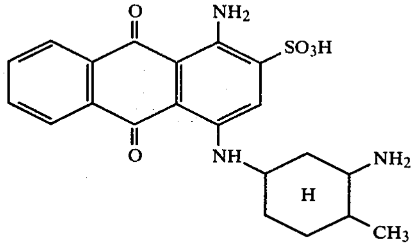 | 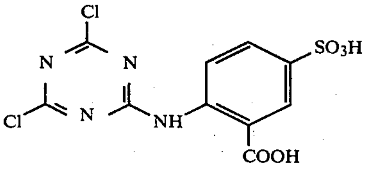 |

Table II-continued
| Example No. | Anthraquinone component (2) | Reactive component (3) |
|---|---|---|
| 35 | 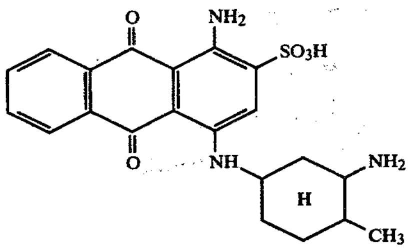 | 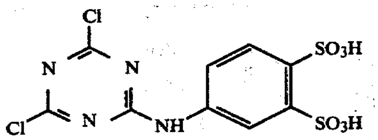 |
| 36 | 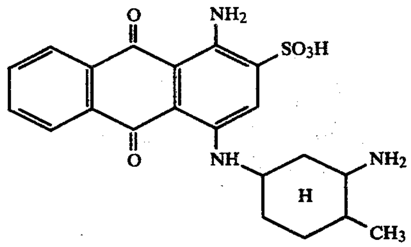 | 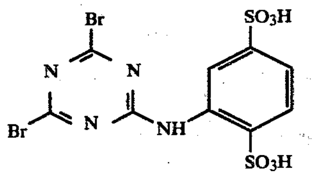 |
| 37 | 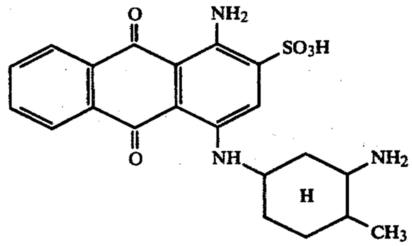 | 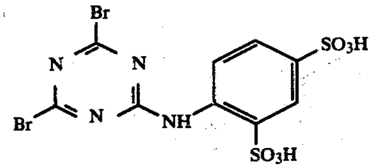 |
| 38 | 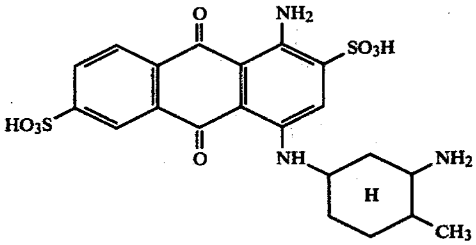 | 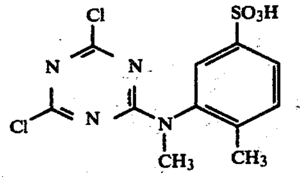 |
| 39 | 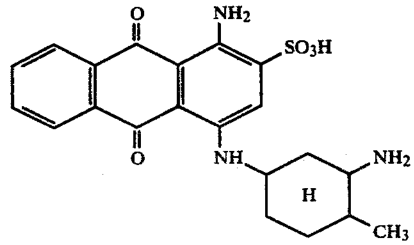 | 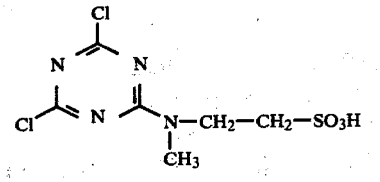 |
| 40 | 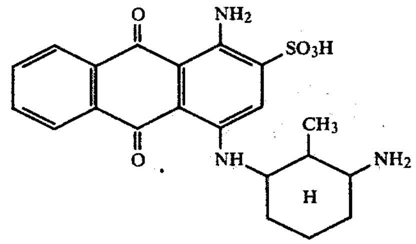 | 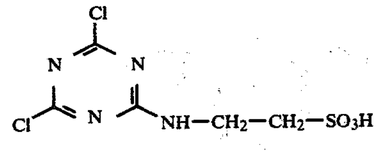 |

Table II-continued
| Example No. | Anthraquinone component (2) | Reactive component (3) |
|---|---|---|
| 41 | 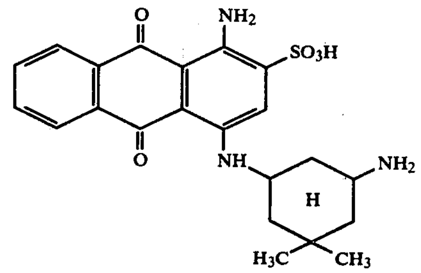 | 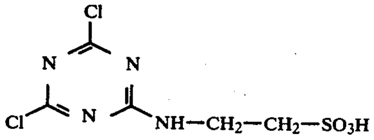 |
| 42 | 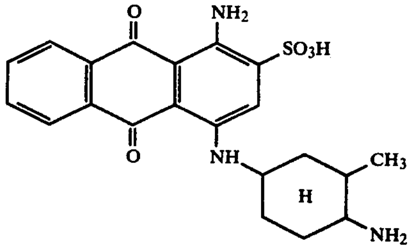 | 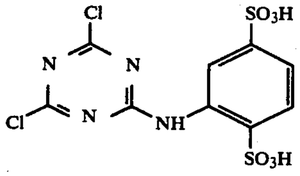 |
| 43 | 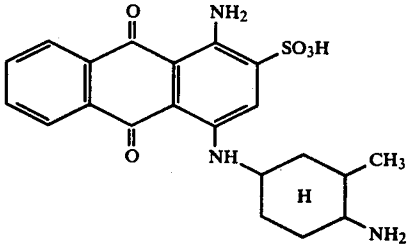 | 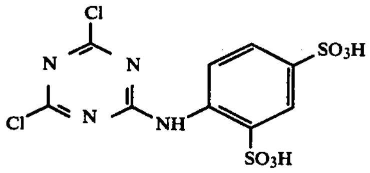 |
| 44 | 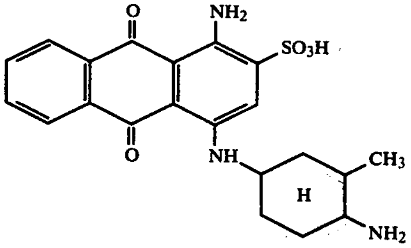 | 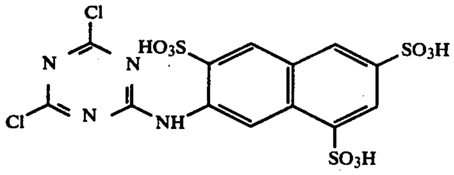 |
| 45 | 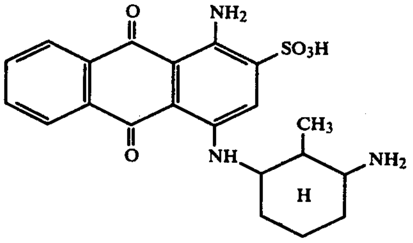 | 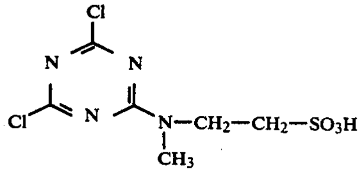 |
| 46 | 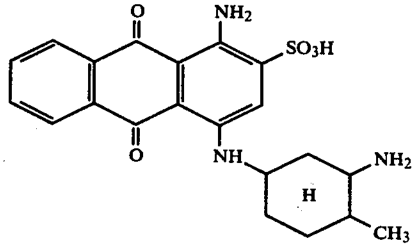 | 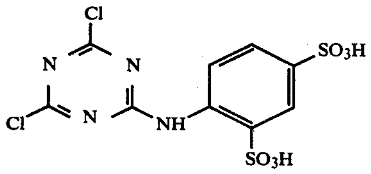 |

Table II-continued

| Example No. | Anthraquinone component (2) | Reactive component (3) |
|---|---|---|
| 47 | 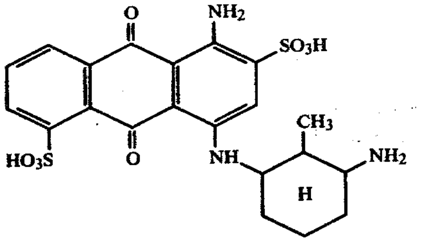 | 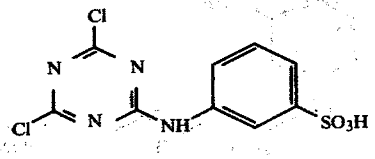 |
| 48 | 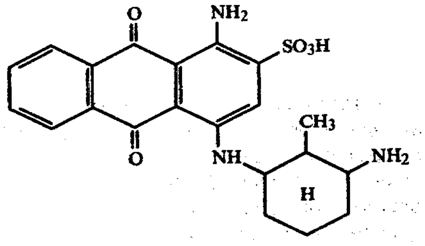 | 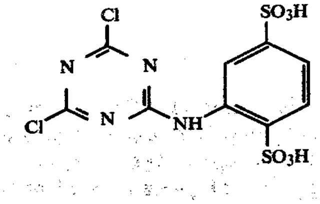 |
| 49 | 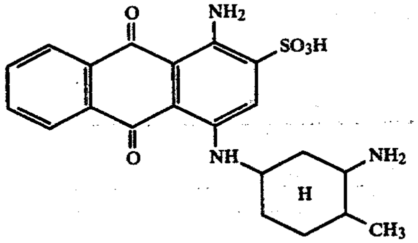 | 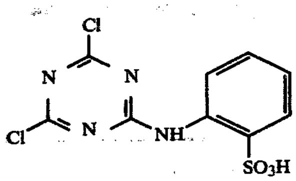 |
| 50 | 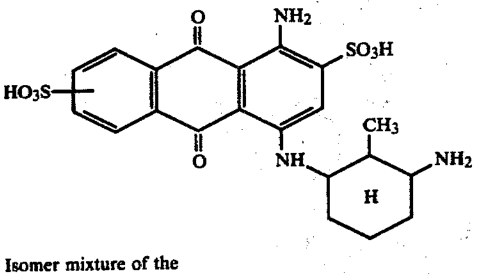 Isomer mixture of the 2,6- and 2,7-disulphonic acid | 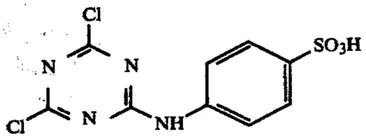 |

EXAMPLE 51

15.0 g of 1-amino-4-(3'-amino-4'-methyl-cyclohexylamino)-anthraquinone-2-sulphonic acid are dissolved, at PH 12, in 350 ml of water at 60° and, after cooling the solution to 20°, 300 ml of acetone are added and the PH value is adjusted to 10.

The resulting solution is added dropwise, in the course of 30 minutes, to a suspension which has been prepared by pouring a solution of 8.0 g of cyanuric chloride in 80 ml of acetone onto 80 g of ice. During the dropwise addition of the dyestuff component, the pH value of the reaction mixture is kept at 8.0-8.5 with 2 N sodium hydroxide solution, and the mixture is then further stirred for a short time under these pH conditions and at 0°-5°, until the reaction has ended, which can easily be established by chromatography.

A solution of 6.4 g of sodium 2-aminoethanesulphonate in 60 ml of water is now added to the resulting solution of the dichlorotriazinyl dyestuff component. The pH value is kept at 7.5 and the temperature is increased to 35°-40°. After some hours, the condensation reaction has ended. The results dyestuff of the formula

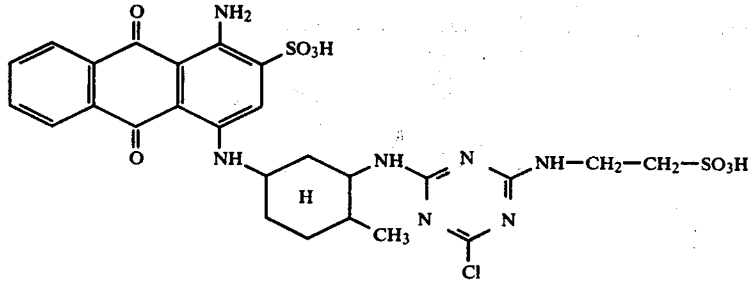

is salted out with sodium chloride, filtered off and washed with 15% strength sodium chloride solution. On cotton, the dyestuff gives, in accordance with the application processes of Examples 23 and 24, clear blue dyeings which are fast to light and wet processing.

Further clear blue reactive dyestuffs are obtained in an analogous manner if the anthraquinone components contained in column (2) of Table III are reacted with cyanuric chloride and the resulting intermediate products are subjected to condensation reactions with the aminoaryl- or aminoalkylsulphonic acids.

Table III

| Example No. | Anthraquinone component (2) | Aminoaryl/alkylsulphonic acid (3) |
|---|---|---|
| 52 | 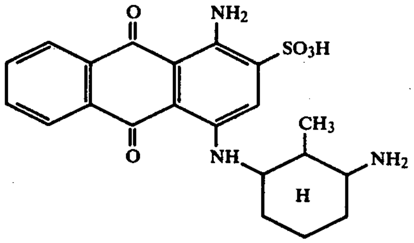 | 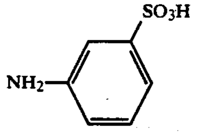 |
| 53 | 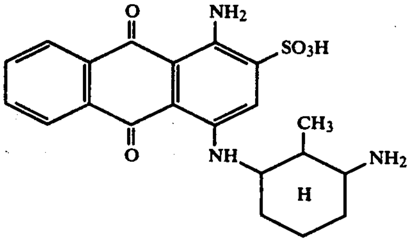 | $NH(CH_3)-CH_2-CH_2-SO_3H$ |
| 54 | 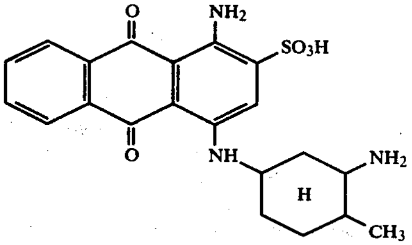 | 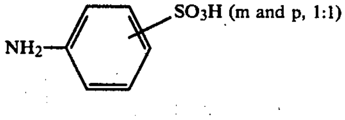 |
| 55 | 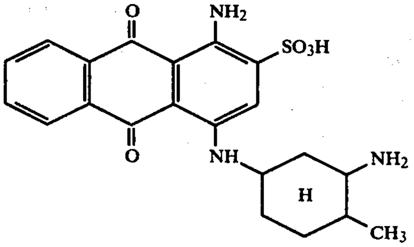 | 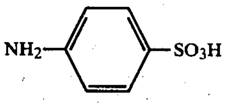 |

Table III-continued

| Example No. | Anthraquinone component (2) | Aminoaryl/alkylsulphonic acid (3) |
|---|---|---|
| 56 | 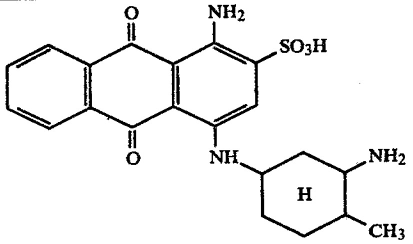 | 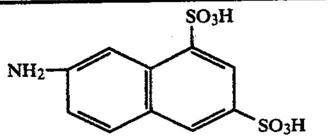 |
| 57 | 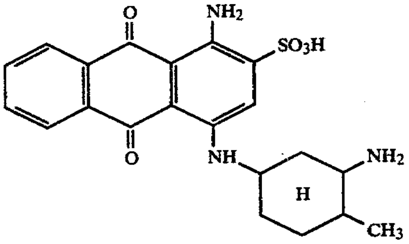 | $\underset{CH_3}{NH}-CH_2-SO_3H$ |
| 58 | 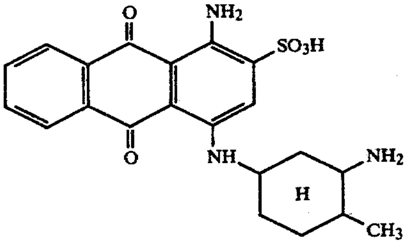 | 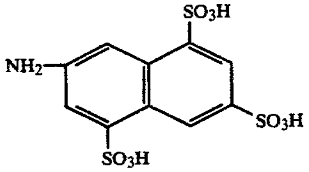 |
| 59 | 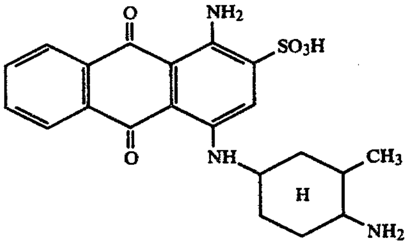 | $NH_2-CH_2-CH_2-OSO_3H$ |

We claim:

1. Dyestuffs of the formula

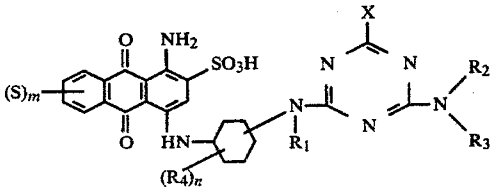

wherein

S=a $SO_3H$, chlorine, bromine, hydroxyl and acetylamino, m=0, 1 or 2,

X=F, Cl or Br, $R_1$ and $R_2$=H or optionally substituted $C_1$-$C_4$-alkyl and $R_3$=optionally substituted phenyl, naphthyl or optionally substituted $C_1$-$C_4$-alkyl, at least one of the radicals $R_2$ or $R_3$ containing at least one group which confers solubility in water.

$R_4$=an optionally substituted $C_1$-$C_4$- alkyl and n=1, 2, 3 or 4.

2. Dyestuffs of the formula

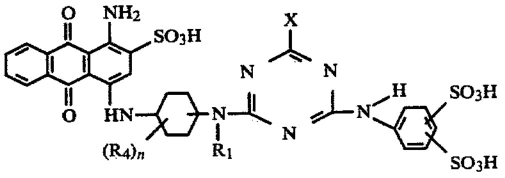

wherein

X, $R_1$ and $R_4$ have the meaning indicated in claim 1 and n=1 or 2.

3. Dyestuffs of claims 1 or 2, wherein X=F or Cl.

4. Use of the dyestuffs of claims 1 or 2 for dyeing and printing fibre materials containing hydroxyl groups and fibre materials containing amide groups.

* * * * *